United States Patent
Licht et al.

(10) Patent No.: US 10,385,152 B2
(45) Date of Patent: Aug. 20, 2019

(54) COPOLYMER MADE FROM CYCLIC EXO-VINYL CARBONATE ACRYLATES

(71) Applicant: BASF SE, Ludwigshafen (DE)

(72) Inventors: Ulrike Licht, Mannheim (DE); Karl-Heinz Schumacher, Neustadt (DE); Rainer Klopsch, Worms (DE); Diego Ghislieri, Heppenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/736,970

(22) PCT Filed: Jun. 8, 2016

(86) PCT No.: PCT/EP2016/062938
§ 371 (c)(1),
(2) Date: Dec. 15, 2017

(87) PCT Pub. No.: WO2016/202652
PCT Pub. Date: Dec. 22, 2016

(65) Prior Publication Data
US 2018/0155479 A1    Jun. 7, 2018

(30) Foreign Application Priority Data
Jun. 18, 2015 (EP) .................... 15172703

(51) Int. Cl.
| | | |
|---|---|---|
| C09D 135/02 | (2006.01) | |
| C09J 135/02 | (2006.01) | |
| B32B 7/12 | (2006.01) | |
| B32B 27/08 | (2006.01) | |
| B32B 27/32 | (2006.01) | |
| B32B 27/36 | (2006.01) | |
| B32B 37/12 | (2006.01) | |
| C08F 222/20 | (2006.01) | |
| C08F 226/00 | (2006.01) | |
| C08F 220/18 | (2006.01) | |
| C08G 71/04 | (2006.01) | |
| B32B 7/00 | (2019.01) | |
| B32B 27/00 | (2006.01) | |
| C09D 11/107 | (2014.01) | |

(52) U.S. Cl.
CPC .............. *C08F 222/20* (2013.01); *B32B 7/00* (2013.01); *B32B 7/12* (2013.01); *B32B 27/00* (2013.01); *B32B 27/08* (2013.01); *B32B 27/32* (2013.01); *B32B 27/36* (2013.01); *B32B 37/12* (2013.01); *C08F 220/18* (2013.01); *C08F 226/00* (2013.01); *C08G 71/04* (2013.01); *C09D 11/107* (2013.01); *C09D 135/02* (2013.01); *C09J 135/02* (2013.01); *B32B 2037/1269* (2013.01)

(58) Field of Classification Search
None
See application file for complete search history.

(56) References Cited

U.S. PATENT DOCUMENTS

| | | | |
|---|---|---|---|
| 2003/0100687 A1 | 5/2003 | Ohrbom et al. | |
| 2013/0331532 A1* | 12/2013 | Porta Garcia | C08F 24/00 526/269 |

FOREIGN PATENT DOCUMENTS

| | | |
|---|---|---|
| DE | 1 064 938 | 9/1959 |
| DE | 1 176 358 | 8/1964 |
| DE | 26 39 083 A1 | 3/1978 |
| DE | 27 37 951 A1 | 3/1979 |
| EP | 0 622 378 A1 | 11/1994 |
| WO | 2011/089089 A1 | 7/2011 |
| WO | 2011/157671 A1 | 12/2011 |
| WO | 2012/175427 A2 | 12/2012 |
| WO | 2012/175431 A2 | 12/2012 |
| WO | 2013/144299 A1 | 10/2013 |

OTHER PUBLICATIONS

International search Report dated Aug. 19, 2016 in PCT/EP2016/062938 (with English translation of categories of cited documents, English translation previously filed).
International Preliminary Report on Patentability and Written Opinion dated Dec. 19, 2017 in PCT/EP2016/062938 (with English translation).
International Search Report dated Aug. 19, 2016, in PCT/EP2016/062938, filed Jun. 8, 2016.

* cited by examiner

*Primary Examiner* — Christopher M Rodd
(74) *Attorney, Agent, or Firm* — Oblon, McClelland, Maier & Neustadt, L.L.P.

(57) ABSTRACT

What are described are copolymers formed from (a) at least one monomer M1 of the formula

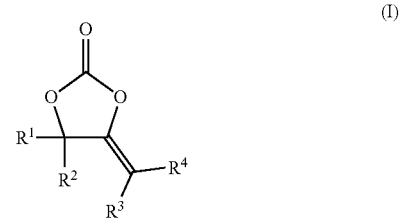

(I)

in which $R^1$ is an organic radical having a (meth)acryloyl group,
$R^2$, $R^3$ and $R^4$ are each independently a hydrogen atom or a C1- to C10-alkyl group; and
(b) at least one ethylenically unsaturated, free-radically copolymerizable monomer M2 other than the monomers M1. What are also described are two-pack adhesives comprising the copolymers and a polyfunctional hardener. The copolymers and the two-pack adhesives can be used as laminating adhesives.

18 Claims, No Drawings

COPOLYMER MADE FROM CYCLIC EXO-VINYL CARBONATE ACRYLATES

The invention relates to copolymers formed from (a) monomers M1 of the formula

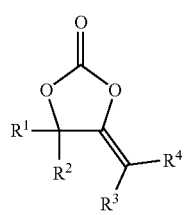
(I)

in which $R^1$ is an organic radical having a (meth)acryloyl group,
$R^2$, $R^3$ and $R^4$ are each independently a hydrogen atom or a C1- to C10-alkyl group; and
(b) ethylenically unsaturated, free-radically copolymerizable monomers M2 other than the monomers M1. What are also described are two-pack adhesives comprising the copolymers and a polyfunctional hardener. The copolymers and the two-pack adhesives can be used as laminating adhesives.

Laminating adhesives used for flexible food packaging are frequently two-pack systems in which isocyanate components react with polyol components to give a high molecular weight polymer. These systems are applied either as solvent-free and anhydrous reactive one hundred percent systems or in the form of adhesive dissolved in an organic solvent. The adhesives are applied by means of a suitable application system to a polymer film or aluminum foil or else to paper, and then, optionally after the evaporation of the solvent, a second film/foil is laminated on under pressure and optionally at elevated temperature. In such an operation, it is possible to produce laminates consisting of two or more films/foils or paper plies. The reactive isocyanates present in conventional laminating adhesives constitute a toxicological risk. This relates firstly to the processing of these adhesives in the laminate production, because the isocyanates generally have a high toxicity and a high allergenic potential. Secondly, there is the risk that aromatic isocyanate that has not reacted fully in the flexible packaging laminate will migrate through the inner film/foil into the packaged food and undergo hydrolysis therein by water fractions in the food to give carcinogenic aromatic amines.

WO 2011/157671 discloses a cyclic carbonate compound having a double bond directly on the ring system, which is also referred to as exo-vinylene carbonate. There is no description of any cyclic exo-vinylene carbonate compounds having a polymerizable acrylate group.

US 2003/100687 discloses 4-(meth)acryloyloxyalkyl-1,3-dioxolan-2-ones, which are polymerized with ethylenically unsaturated comonomers to give copolymers having 1,3-dioxolan-2-one groups bonded via alkyloxycarbonyl units. The polymers are reacted with aminic compounds to obtain graft polymers having urethane and hydroxyl groups. The graft polymers are used in coating compositions.

Compounds having a cyclic carbonate group and having a polymerizable double bond are known from WO 2013/144299. The polymerizable double bond is bonded here via a spacer to the exo-vinylene group of the exo-vinylene carbonate of WO 2011/157671. The cyclic carbonate compounds of WO 2013/144299 are polymerized and find a wide variety of uses as polymers or copolymers. However, the reactivities are still not entirely sufficient for uses in two-pack adhesives.

It was an object of the invention to make available a suitable alternative isocyanate-free laminating adhesive for flexible packagings. This adhesive should be capable of building up sufficiently high bond strengths in the packaging laminate within a short time.

This was possible through the copolymerization of particular exo-vinylene carbonate-containing acrylates with comonomers containing olefinic double bonds and blends of these copolymers with a polyfunctional hardener component. The laminating adhesive of the invention can be applied as a solution in an organic solvent or as a solvent- and water-free one hundred percent system.

The invention provides copolymers formed by free-radical copolymerization from
(a) at least one monomer M1 of the formula

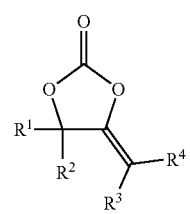
(I)

in which $R^1$ is an organic radical having a (meth)acryloyl group,
$R^2$, $R^3$ and $R^4$ are each independently a hydrogen atom or a C1- to C10-alkyl group; and
(b) at least one, for example 1, 2, 3 or more, ethylenically unsaturated, free-radically copolymerizable monomer M2 other than the monomers M1.

The monomers M1 are preferably used in an amount of at least 1% by weight, especially at least 5% by weight or at least 10% by weight, for example from 5% to 50% by weight, more preferably from 15% to 35% by weight, based on the total amount of all the monomers. The monomers M2 are preferably used in an amount of 1% to 99% by weight, more preferably from 50% to 95% by weight or from 65% to 85% by weight, based on the total amount of all the monomers.

In formula (I), $R^1$ is an organic radical having a (meth)acryloyl group. $R^2$, $R^3$ and $R^4$ are each independently a hydrogen atom or a C1- to C10-alkyl group. Compounds of the formula I are also referred to hereinafter as exoVC (meth)acrylates. Preferably, $R^1$ is an organic radical having a total of not more than 24 carbon atoms, especially not more than 18 carbon atoms and more preferably not more than 14 carbon atoms. $R^1$ may, as well as oxygen, comprise further heteroatoms such as nitrogen or sulfur.

In a particular embodiment, $R^1$ consists exclusively of carbon, hydrogen and oxygen, and therefore does not contain any further heteroatoms apart from oxygen atoms. Oxygen atoms are present in the acryloyl group or methacryloyl group, (meth)acryloyl group for short, and optionally in further functional groups such as ether groups, hydroxyl groups or carbonyl groups. More particularly, R comprises oxygen in the (meth)acryloyl group and beyond that only in any ether groups present.

More preferably, $R^1$ is one of the groups of the formula (II), (III) or (IV) below.

In formula (II)

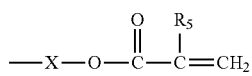

X is a bond or an alkylene group having 1 to 18 carbon atoms and $R^5$ is a hydrogen atom or a methyl group. Preferably, X is an alkylene group having 1 to 18 carbon atoms. The alkylene group may be a linear or branched alkylene group. Particular preference is given to an alkylene group having 1 to 10 carbon atoms. More particularly, it is a linear C1- to C10-alkylene group. In a particular embodiment, it is a linear C2- to C8-alkylene group. More particularly, it is a linear C2- to C6-alkylene group, for example an ethylene, n-propylene or n-butylene group; most preferably, X is an n-propylene group.

In formula (III)

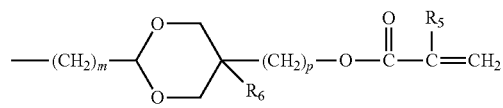

m and p are each independently 0 or an integer from 1 to 10, $R^5$ is as defined above and $R^6$ is a hydrogen atom or a C1- to C10-alkyl group. Preferably, m is an integer from 1 to 10, especially an integer from 1 to 6; most preferably, m is 1. Preferably, p is 0 or an integer from 1 to 6; p is especially an integer from 1 to 6; most preferably, p is 1. In a particular embodiment, m and p are each independently an integer from 1 to 6. In a very particular embodiment, both m and p are 1. $R^6$ is preferably a hydrogen atom or a C1- to C6-alkyl group. In a particular embodiment, $R^6$ is a C1- to C6-alkyl group, for example a methyl group or ethyl group, especially an ethyl group.

In formula (IV)

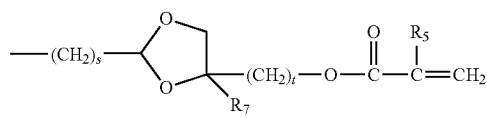

s and t are each independently 0 or an integer from 1 to 10, $R^5$ is as defined above and $R^7$ is a hydrogen atom or a C1- to C10-alkyl group. Preferably, s and t are each independently an integer from 1 to 10, especially an integer from 1 to 6. In a particular embodiment, both s and t are 1. $R^7$ is preferably a hydrogen atom or a C1- to C6-alkyl group. In a particular embodiment, $R^7$ is a hydrogen atom.

In the compounds of the formula I, $R^2$ is preferably a hydrogen atom or a C1- to C6-alkyl group. In particular, $R^2$ is a C1- to C6-alkyl group, more preferably a methyl group.

In the compounds of the formula I, $R^3$ and $R^4$ are each independently a hydrogen atom or a C1- to C10-alkyl group. The alkyl group is especially a C1- to C6-alkyl group, preferably a C1- to C3-alkyl group and, in a particular embodiment, a methyl group.

Preferably, at least one of the $R^3$ and $R^4$ radicals is a hydrogen atom. More preferably, both $R^3$ and $R^4$ are a hydrogen atom or one of $R^3$ and $R^4$ is a hydrogen atom and the other is an alkyl group, especially a methyl or ethyl group. Most preferably, both $R^3$ and $R^4$ are a hydrogen atom.

$R^5$ in all the compounds of the formula I (or of the formulae II to IV) is preferably a hydrogen atom; therefore, compounds of the formula I are preferably acryloyl compounds.

Particularly preferred compounds of the formula I are those in which $R^1$ is a group of the formula (II) or (III), especially a group of the formula (II).

Examples of compounds of the formula (1) include the following preferred compounds:

compound of the formula I a:

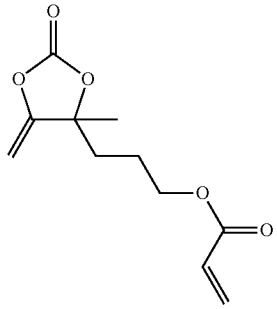 [SMILES: C=CC(=O)OCCCC1(C)OC(=O)OC1=C]

compound of the formula I b:

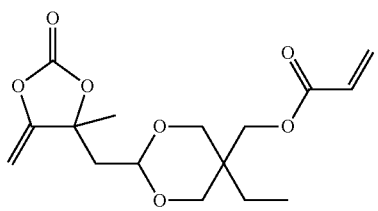 [SMILES: C=CC(=O)OCC1(CC)COC(CC2(C)OC(=O)OC2=C)OC1]

compound of the formula I c:

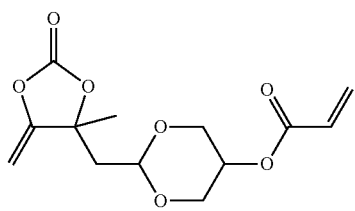 [SMILES: C=CC(=O)OC1COC(CC2(C)OC(=O)OC2=C)OC1]

and compound of the formula I d

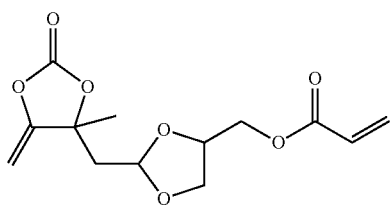 [SMILES: C=CC(=O)OCC1COC(CC2(C)OC(=O)OC2=C)O1]

Preparation of compounds of the formula (I) with $R^1$=formula (II):

Compounds of the formula (I) with $R^1$=formula (II) can especially be prepared by a process in which in a first stage a compound having a terminal triple bond is reacted with a hydroxyalkanone or hydroxyalkanal, where the triple bond adds onto the carbonyl group of the hydroxyalkanone or hydroxyalkanal to form a dihydroxyl compound, in a second stage the hydroxyl group in the resultant dihydroxyl compound that did not originate from the carbonyl group is protected with a protecting group, in a third stage the ring is closed with carbon dioxide to give a carbonate group and in a fourth stage the protecting group is replaced with a (meth)acryloyl group.

Stage 1:

The reaction in the first stage is an addition, which is known per se, of triple bonds onto a carbonyl group. Suitable compounds having a terminal triple bond are especially compounds of the formula V

where Y is a hydrogen atom, a hydrocarbyl group having 1 to 10 carbon atoms, for example an alkyl or aryl group or a protecting group having not more than 10 carbon atoms. If Y is not a protecting group, the substituents of the Y-substituted carbon atom determine the later R3 and R4 radicals in formula I. Proceeding from formula V, therefore, one of the R3 or R4 radicals in formula I is a hydrogen atom and the other is Y. The preferred definitions of Y therefore correspond to the above preferred definitions of R3 and R4.

Y may, however, also be a protecting group. Protecting groups are detached again during or after the synthesis, and so, in this case, the later R3 and R4 radicals in formula I are both a hydrogen atom. A suitable protecting group is, for example, the trimethylsilyl group (TMS for short).

Preferred hydroxyalkanones or hydroxyalkanals are compounds of the formula VI

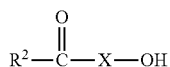

in which R2 is a hydrogen atom or a C1- to C10-alkyl group. R2 corresponds to R2 in formula I; in a preferred embodiment, R2 is a methyl group. X corresponds to X in formula II. With regard to the preferred definitions of R2 and X, details have already been given above.

Various methods are known for performance of the addition reaction. Preferably, the starting compounds are converted in the presence of a strong base. Preferred strong bases are metal alkoxides. These are preferably metal salts of aliphatic alcohols, especially metal salts of C1 to C8, preferably C2 to C6, alcohols such as ethanol, n-propanol, isopropanol, n-butanol or tert-butanol. The metal cations of the metal alkoxides are preferably alkali metal cations, for example the cations of sodium or potassium. Preferred metal alkoxides include, for example, potassium tert-butoxide, sodium tert-butoxide, potassium isopropoxide and sodium isopropoxide.

The reaction is preferably conducted in the presence of a solvent. Preferred solvents are inert solvents; these do not comprise any reactive groups which react with the starting compounds. Particular preference is given to inert polar aprotic solvents. Examples of these include cyclic ether compounds, especially THF. The reaction is generally exothermic; therefore, cooling is preferably effected in the course of reaction. The temperature of the reaction mixture is preferably not more than 50° C., especially not more than 25° C.; it is preferably between 0 and 25° C.

For workup of the resultant product mixture, it is possible to add water, optionally acid and optionally a nonpolar organic solvent. If the product of value from the 1st stage already forms a separate organic phase, it is possible to dispense with the organic solvent. Two phases form, of which it is the organic phase that comprises the product of the 1st stage (addition products). The organic phase can be dried for removal of water. Solvent can be removed easily by distillation. The product can be obtained in pure form by vacuum distillation. Alternatively, the workup can also be effected by customary methods of crystallization or extraction, especially when the product of the 1st stage has a very high boiling point.

Stage 2:

In the second stage, a hydroxyl group of the resultant dihydroxyl compound is protected with a protecting group. The hydroxyl group which originated from the carbonyl group is reacted in the third stage with $CO_2$ to give the carbonate ring. The hydroxyl group of the starting compound that was already present before the 1st stage (starting hydroxyl group for short) is protected in order to avoid side reactions.

Suitable protecting groups are especially ester groups. For this purpose, the starting hydroxyl group is reacted with an acid or an acid derivative. Preference is given to reaction with a carboxylic acid, e.g. formic acid or acetic acid, or especially with a carboxylic acid derivative, for example a carboxylic anhydride, carboxylic ester or carbonyl chloride.

The starting hydroxyl group is much more reactive than the hydroxyl group which originated from the carbonyl group. Therefore, the esterification at first forms only the ester of the starting hydroxyl group. The esterification is stopped before any noticeable ester formation with the other hydroxyl group is observed. The conversion can be monitored by gas chromatography.

The esterification can be conducted by customary methods. In the course of the reaction, the temperature is preferably increased only gradually, such that the progress of the ester formation can be followed closely by chromatography and the reaction can be stopped at the correct time. The reaction can be conducted, for example, at temperatures of 0 to 100° C., preferably between 0 and 40° C. The resultant ester can be purified by distillation. In the case of high boiling points, another option is workup and purification by crystallization or extraction.

Stage 3:

In a third stage, the ring is closed with carbon dioxide to form the cyclic carbonate group. For this purpose, carbon dioxide, preferably in gaseous form or in the supercritical state, is contacted with the ester under pressure. The reaction is therefore preferably conducted in an autoclave. Carbon dioxide can also be used in a mixture with inert gas.

The reaction is preferably effected in the presence of catalysts. It is preferably effected in the presence of a base as catalyst or more preferably in the presence of a catalyst system composed of a base and a metal salt. Preferred bases are compounds having at least one tertiary amino group, for example having one to three tertiary amino groups. Bases of this kind are known. They typically have a molar mass below 500 g/mol, especially below 300 g/mol. They are especially aliphatic or cycloaliphatic compounds.

Examples of bases include

TMTACN (N,N',N"-trimethyl-1,4,7-triazacyclononane),
PMDETA (pentamethyldiethylenetriamine)
TMEDA (tetramethylethylenediamine)
DBU (1,8-diazabicyclo[5.4.0]undec-7-ene) or
DBN (1,5-diazabicyclo[4.3.0]non-5-ene).

The metal salt preferably comprises salts having mono- to trivalent cations, especially cations of Cu, Ag or Au. The anion of the metal salts is preferably a carboxylate, especially a C1- to C6-carboxylate. Preferred metal salts include silver acetate and copper acetate.

Phosphines are also useful as catalysts. These are especially trialkyl- or triarylphosphines. These can be used alone or likewise in combination with a metal salt.

The reaction is conducted preferably at a pressure of 1 to 100 bar, especially 5 to 70 bar. The temperature of the reaction mixture is preferably 10 to 100° C., especially 10 to 80° C. The reaction can be monitored, for example, by gas chromatography.

After cooling and decompression, the resultant product (exoVC ester) can be worked up. It is possible to add an organic solvent, preferably an inert, hydrophobic organic solvent such as dichloromethane or toluene, and aqueous acid, for example HCl, such that two phases form. The organic phase comprises the desired product. Water can be removed from the organic phase by drying. Solvent can be removed by distillation. The product can be purified by distillation. A gentle and therefore preferred distillation is, for example, distillation in a thin-film evaporator. Especially suitable for this purpose are thin-film evaporators having a wiper system. An alternative option in the case of high boiling points of the product of the third stage is a workup and purification by crystallization or extraction.

Stage 4:

In the 4th stage, the protected exoVC obtained in the third stage, for example the exoVC ester, is reacted with a (meth)acryloyl compound to give the exoVC (meth)acrylate of the formula I. The (meth)acryloyl compound used is especially an alkyl (meth)acrylate, e.g. methyl (meth)acrylate. The protecting group, the formate here, is replaced by the (meth)acryloyl group, releasing the corresponding alkyl formate.

This reaction can be conducted by various methods known to those skilled in the art. Preferably, it is conducted by enzymatic means. Suitable enzymes for this purpose are lipases. Lipases catalyze degradation of fats and formation of fats from fatty acids and glycerol, and are therefore also suitable as catalysts for esterifications or transesterifications or corresponding transesterification reactions in which two esters exchange their radicals of the alcohol used that originate from the esterification reaction. A suitable lipase is, for example, the enzyme *Candida Antarctica* lipase B. The lipases are preferably used in an immobilized form. Immobilized lipases are those bound to a support. Suitable supports are natural organic polymers such as cellulose, synthetic organic polymers such as polystyrene or inorganic substances such as clays or silicates.

The enzymatically catalyzed reaction can be effected, for example, at a temperature of the reaction mixture of 0 to 100° C., preferably 20 to 80° C., more preferably 30 to 60° C. The reaction is conducted in a simple manner at standard pressure; no lowering or increase in the pressure is necessary, nor is it disadvantageous.

The reaction is an equilibrium reaction. The compound released in the reaction is therefore preferably removed from the mixture, whether by distillative removal, for example of the alkyl formate released, or else by absorption, for example on a molecular sieve. The compound released can be removed continuously, for example by means of a permanent vacuum. Alternatively, the reaction can be stopped after a particular time in order to remove the compound released, and then continued again. Finally, the enzyme can be removed from the reaction mixture by filtration and the mixture can be purified by distillative removal of the unconverted starting materials or by-products formed.

The reaction proceeds without difficulty overall and in a simple manner over all four stages, and is therefore also suitable for an industrial scale. The exoVC (meth)acrylate is obtained with high yield and selectivity. A schematic diagram of the four stages can also be found in preparation example 2.1.

Preparation of compounds of the formula (I) with $R^1$=formula (III)

Compounds of the formula (I) with $R^1$=formula (III) can especially be prepared by process in which in a first stage a compound having a terminal triple bond is reacted with an alkanone or alkanal comprising an acetal group, where the triple bond adds onto the carbonyl group of the alkanone or alkanal to form a hydroxyl compound, in a second stage the ring is closed with carbon dioxide to give a carbonate group, in a third stage the ring closure is conducted to give a 1,3-dioxane ring by reaction of the acetal group with a compound having a total of at least three hydroxyl groups, where two of the hydroxyl groups are in the 1,3 positions, and in a fourth stage the (meth)acryloyl group is introduced by an esterification or transesterification of the remaining hydroxyl group.

Stage 1

The reaction in the first stage is an addition, which is known per se, of triple bonds onto a carbonyl group. Suitable compounds having a terminal triple bond are especially compounds of the formula V as detailed above. The above details relating to formula V and the preferred compounds of the formula apply here correspondingly.

The alkanones or alkanals used comprise an acetal group. Preferred alkanones or alkanals having an acetal group are those of the formula VII

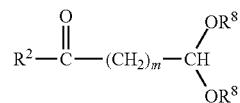

in which $R^2$ is a hydrogen atom or a C1- to C10-alkyl group, m is 0 or an integer from 1 to 10. m corresponds to m in the above formula III and has the corresponding definitions and preferred definitions.

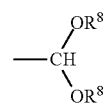

represents the acetal group, where $R^8$ is a hydrocarbyl group, especially a $C_1$- to $C_{10}$-alkyl group, more preferably a methyl group. $R^2$ corresponds to $R^2$ in formula I and has the corresponding definitions and preferred definitions; in a preferred embodiment. $R^2$ is a methyl group.

For performance of the addition reaction, the above details relating to stage 1 in the preparation of compounds of the formula I with $R^1$=formula II apply analogously.

Stage 2

In stage 2, the ring is closed. The above details relating to stage 3 in the preparation of compounds of the formula I with $R^1$=formula II apply here analogously. The product of the second stage is a compound having a cyclic carbonate group and an acetal group.

Stage 3

In the 3rd stage, the ring is closed to give the 1,3-dioxane ring. For this purpose, the product of the second stage is reacted with a compound having a total of at least three hydroxyl groups, preferably exactly three hydroxyl groups, where two of the hydroxyl groups are in the 1,3 positions. The two hydroxyl groups in the 1,3 positions form the 1,3-dioxane ring through reaction with the acetal group. This reaction can be conducted by customary methods.

The compound having the at least three hydroxyl groups is preferably a compound of the formula VIII

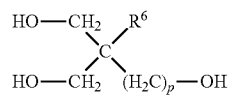

$R^6$ and p correspond to $R^6$ and p in the above formula III and therefore have the corresponding definitions and preferred definitions. More particularly, the compound of the formula VIII is trimethylolpropane.

The reaction can be conducted in the presence or absence of solvent. It is preferably effected in the presence of solvent. The solvent is preferably chosen such that all starting materials are very substantially dissolved. In the course of the reaction, the alcohol HO—$R^8$ is eliminated, especially methanol. When a high-boiling solvent such as toluene is used, methanol can easily be removed by distillation. The alcohol HO—$R^8$, especially methanol, can, however, also remain in the reaction mixture; therefore, solvents having a lower boiling point or polar solvents such as acetonitrile are also suitable.

Preferably, the reaction is effected in the presence of catalysts. Suitable catalysts are, for example, organic or inorganic acids. Examples include methanesulfonic acid and p-toluenesulfonic acid.

The solvent used in the reaction can optionally be removed prior to further workup. The workup can again be effected by a phase separation. For this purpose, a suitable solvent which very substantially dissolves the product of value from the 3rd stage and is immiscible with water is added. Useful solvents include, for example, toluene or MTBE (methyl tert-butyl ether). The resultant organic phase can be washed once or more than once with water. The aqueous phase is discarded in each case. The organic phase can be purified by distillation or crystallization.

The 4th Stage

In the 4th stage, finally, the compound of the formula I with $R^1$=formula III is obtained by a transesterification. This 4th stage corresponds to the 4th stage in the preparation of compounds of the formula I with $R^1$=formula II, except with the difference that the starting material here is not a protected alcohol but an unprotected alcohol. Therefore, all the above details in this regard apply correspondingly.

A schematic diagram of the four stages can also be found in the preparation example.

In an alternative procedure, the sequence of the stages could be altered and, for example, the sequence of stages 2 and 3 could be reversed, so as to result in the sequence 1-3-2-4 of the above stages. In that case, first of all, the transacetalization of the compound of the formula VIII with the compound of the formula VIII would be conducted. Preferably, the third hydroxyl group of the compound VIII which is not to be involved in the transacetalization is protected by a protecting group. Only then is the ring closed with $CO_2$.

Preference is given, however, to the above numerical sequence of the stages from stage 1, through stage 2, then 3 to stage 4.

Preparation of compounds of the formula (I) with $R^1$=formula (IV)

Compounds of the formula (I) with $R^1$=formula (IV) can especially be prepared by process in which in a first stage a compound having a terminal triple bond is reacted with an alkanone or alkanal comprising an acetal group, where the triple bond adds onto the carbonyl group of the alkanone or alkanal to form a hydroxyl compound, in a second stage the ring is closed with carbon dioxide to give a carbonate group, in a third stage the ring closure is conducted to give a 1,3-dioxolane ring by reaction of the acetal group with a compound having a total of at least three hydroxyl groups, where two of the hydroxyl groups are in the 1,2 positions, and in a fourth stage the (meth)acryloyl group is introduced by an esterification or transesterification of the remaining hydroxyl group.

These four stages correspond to the four stages in the above-described preparation of compounds of the formula I with $R^1$=formula III. Therefore, the above details relating to the preparation of compounds of the formula I with $R^1$=formula III apply correspondingly, unless stated otherwise hereinafter. The essential difference is naturally the choice of the compound having the at least three hydroxyl groups in the 3rd stage, since a 1,3-dioxolane ring (five-membered ring) is being prepared rather than a 1,3-dioxane ring (six-membered ring). Correspondingly, two of the hydroxyl groups of the compound are in the 1,2 positions. A preferred compound having three hydroxyl groups of this kind is glycerol.

Suitable monomers M2 (comonomers) are, in particular, monoethylenically unsaturated comonomers, but also conjugated diethylenically unsaturated compounds. The comonomers M2 include, for example:

b1 monoethylenically unsaturated $C_3$-$C_8$ monocarboxylic acids and $C_4$-$C_8$ dicarboxylic adds, for example acrylic acid, methacrylic acid, vinylacetic acid, crotonic acid, fumaric acid, maleic acid and itaconic acid;

b2 amides of monoethylenically unsaturated $C_3$-$C_8$ monocarboxylic acids and $C_4$-$C_8$ dicarboxylic acids, such as acrylamide, methacrylamide, fumaramide and maleimide;

b3 anhydrides of monoethylenically unsaturated $C_4$-$C_8$ dicarboxylic acids, such as maleic anhydride;

b4 hydroxy-$C_2$-$C_4$-alkyl esters of monoethylenically unsaturated $C_3$-$C_8$ monocarboxylic acids and $C_4$-$C_8$ dicarboxylic acids, such as 2-hydroxyethyl acrylate, 2-hydroxypropyl acrylate, 3-hydroxypropyl acrylate, 2-hydroxybutyl acrylate, 4-hydroxybutyl acrylate, 2-hydroxyethyl methacrylate, 2-hydroxypropyl methacrylate, 3-hydroxypropyl methacrylate, 2-hydroxybutyl methacrylate, 4-hydroxybutyl methacrylate;

b5 monoethylenically unsaturated sulfonic acids and salts thereof, for example vinylsulfonic acid, allylsulfonic acid, methallylsulfonic acid, styrenesulfonic acid, 2-acrylamido-2-methylpropanesulfonic acid, 2-methacrylamido-2-methylpropanesulfonic acid, 2-acrylamidoethanesulfonic acid, 2-methacrylamidoethanesulfonic acid, 2-acryloyloxyethanesulfonic acid, 2-methacryloyloxyethanesulfonic acid, 3-acryloyloxypropanesulfonic acid and 2-methacryloyloxypropanesulfonic acid;

b6 monoethylenically unsaturated nitriles having 3 to 5 carbon atoms, such as acrylonitrile and methacrylonitrile;

b7 N-vinylheterocycles such as N-vinylpyrrolidone, N-vinylcaprolactam, N-vinylimidazole;

b8 monoethylenically unsaturated compounds having at least one poly-$C_2$-$C_4$-alkylene oxide group, for example vinyl and allyl ethers of poly-$C_2$-$C_4$-alkylene glycols or $C_1$-$C_{10}$-alkyl poly-$C_2$-$C_4$-alkylene glycols, esters of monoethylenically unsaturated mono- and dicarboxylic acids having 3 to 8 carbon atoms with poly-$C_2$-$C_4$-alkylene glycols or $C_1$-$C_{10}$-alkyl poly-$C_2$-$C_4$-alkylene glycols;

b9 vinylaromatic hydrocarbons such as styrene, α-methylstyrene and the vinyltoluene isomers;

b10 esters of monoethylenically unsaturated $C_3$-$C_8$ monocarboxylic acids with $C_1$-$C_{20}$-alkanols. $C_5$-$C_8$-cycloalkanols, phenyl-$C_1$-$C_4$-alkanols or phenoxy-$C_1$-$C_4$-alkanols, for example esters of acrylic acid with $C_1$-$C_{20}$-alkanols, such as methyl acrylate, ethyl acrylate, n-butyl acrylate, 2-butyl acrylate, isobutyl acrylate, tert-butyl acrylate, 2-ethylhexyl acrylate, decyl acrylate, lauryl acrylate and stearyl acrylate, esters of acrylic acid with $C_5$-$C_{10}$-cycloalkanols such as cyclohexyl acrylate, esters of acrylic acid with phenyl-$C_1$-$C_4$-alkanols, such as benzyl acrylate, 2-phenylethyl acrylate and 1-phenylethyl acrylate, esters of acrylic acid with phenoxy-$C_1$-$C_4$-alkanols, such as 2-phenoxyethyl acrylate, esters of methacrylic acid with $C_1$-$C_{20}$-alkanols, preferably $C_1$-$C_{10}$-alkanols, such as methyl methacrylate, ethyl methacrylate, n-butyl methacrylate, 2-butyl methacrylate, isobutyl methacrylate, tert-butyl methacrylate, 2-ethylhexyl methacrylate, decyl methacrylate, lauryl methacrylate and stearyl methacrylate, esters of methacrylic acid with $C_5$-$C_{10}$-cycloalkanols, such as cyclohexyl methacrylate, esters of methacrylic acid with phenyl-$C_1$-$C_4$-alkanols, such as benzyl methacrylate, 2-phenylethyl methacrylate and 1-phenylethyl methacrylate, and esters of methacrylic acid with phenoxy-$C_1$-$C_4$-alkanols, such as 2-phenoxyethyl methacrylate;

b11 diesters of monoethylenically unsaturated $C_4$-$C_8$ dicarboxylic acids with $C_1$-$C_{20}$-alkanols, $C_5$-$C_8$-cycloalkanols, phenyl-$C_1$-$C_4$-alkanols or phenoxy-$C_1$-$C_4$-alkanols;

b12 $C_1$-$C_{20}$-alkylamides and di-$C_1$-$C_{20}$-alkylamides of monoethylenically unsaturated $C_3$-$C_8$ monocarboxylic acids, especially the $C_1$-$C_{20}$-alkylamides and di-$C_1$-$C_{20}$-alkylamides of acrylic acid and of methacrylic acid, for example ethylacrylamide, dimethylacrylamide, diethylacrylamide, n-propylacrylamide, n-butylacrylamide, laurylacrylamide, stearylacrylamide, ethylmethacrylamide, dimethylmethacrylamide, diethylmethacrylamide, n-propylmethacrylamide, n-butylmethacrylamide, laurylmethacrylamide, stearylmethacrylamide;

b13 vinyl esters of aliphatic carboxylic acids having 1 to 20 carbon atoms, for example vinyl acetate, vinyl propionate, vinyl butyrate, vinyl hexanoate, vinyl laurate and vinyl stearate;

b14 conjugated diethylenically unsaturated $C_4$-$C_{10}$ olefins, such as butadiene and isoprene;

b15 $C_2$-$C_{20}$ olefins, such as ethylene, propene, 1-butene, 2-butene, isobutene, 1-hexene, 1-octene, diisobutene and 1-decene;

b16 halogen-substituted $C_2$-$C_{20}$ olefins, such as vinyl chloride, vinylidene chloride, vinyl bromide, fluoroethene, 1,1-difluoroethene and tetrafluoroethene;

b17 monoethylenically unsaturated monomers having one or two epoxy groups, such as mono- and diesters of monoethylenically unsaturated mono- or dicarboxylic acids, especially mono- and diesters of $C_3$-$C_{10}$-epoxyalkanols, for example mono- or diglycidyl esters of monoethylenically unsaturated $C_3$-$C_8$ monocarboxylic acids or $C_4$-$C_8$ dicarboxylic acids such as glycidyl acrylate and glycidyl methacrylate, or monoethylenically unsaturated esters of $C_3$-$C_{10}$-epoxyalkanols, especially allyl or methallyl ethers, for example allyl glycidyl ether and methallyl glycidyl ether;

b18 monoethylenically unsaturated monomers having at least one carbonate group, especially a cyclic carbonate group, for example a 1,3-dioxolan-2-one group or 4-methyl-1,3-dioxolan-2-one group, for example propylene carbonate acrylate ([1,3-dioxolan-2-on-4-yl]-methyl acrylate) or propylene carbonate methacrylate ([1,3-dioxolan-2-on-4-yl]methyl methacrylate);

b19 esters of monoethylenically unsaturated $C_3$-$C_8$ monocarboxylic acids or monoethylenically unsaturated $C_4$-$C_8$ dicarboxylic acids with $C_8$-$C_{24}$-alkenols or $C_8$-$C_{24}$-alkanediols, especially the esters of acrylic acid or of methacrylic acid, for example oleyl acrylate, oleyl methacrylate, linolyl acrylate or linolyl methacrylate.

Preferred monomers M2 are those of groups b9 (preferably vinylaromatic hydrocarbons, especially styrene), b10 (preferably esters of acrylic acid or of methacrylic acid with $C_1$-$C_{20}$ alcohols, for example n-butyl acrylate, 2-ethylhexyl acrylate, methyl acrylate and methyl methacrylate), b13 (preferably vinyl acetate) and b14 (preferably butadiene).

If the polymer of the invention comprises at least one monomer M2 of groups b9 and b10 in copolymerized form, the monomers M1 to be polymerized preferably comprise 1% to 99% by weight, particularly 5% to 95% by weight and especially 10% to 90% by weight of at least one compound of the formula I and 1% to 99% by weight, particularly 5% to 95% by weight and especially 10% to 90% by weight of at least one preferably monoethylenically unsaturated monomer M2, where the figures in % by weight are based on the total amount of the monomers.

If the monomers M1 of the formula I are copolymerized with a monomer M2 of group b9, such as a vinylaromatic hydrocarbon, for example styrene, and a further monomer M2 of group b10, such as an ester of acrylic acid or methacrylic acid with a $C_1$-$C_{20}$ alcohol, for example methyl acrylate, methyl methacrylate, n-butyl acrylate or 2-ethylhexyl acrylate, the monomers of group b9 to be polymerized are preferably used in an amount of 10% to 80% by weight, especially 20% to 60% by weight, and the monomers of group b10 to be polymerized in an amount of 10% to 80% by weight, especially 20% to 60% by weight, where the figures in % by weight are based on the total amount of the monomers. The monomers of the formula I in that case account for preferably 10% to 80% by weight, especially 20% to 60% by weight, based on the total amount of the monomers M. More particularly, in that case, the comonomers M2 of groups b9 and b10 are preferably used in a ratio of comonomers of group b9 to comonomers of group b10 of 10:1 to 1:10, especially 5:1 to 1:5.

If the monomers M1 of the formula I are copolymerized with a comonomer M2 of group b10, such as an ester of acrylic acid or methacrylic acid with a $C_1$-$C_{20}$ alcohol, for example methyl acrylate, methyl methacrylate, n-butyl acrylate or 2-ethylhexyl acrylate, the monomers M2 of group b10 to be polymerized are preferably used in an amount of 1% to 99% by weight, preferably 50% to 95% by weight, and the monomers M1 of the formula I in an amount of 1% to 99% by weight, preferably 5% to 50% by weight, based on the total amount of the monomers M.

It may also be appropriate that the monomers M1, as well as the monomers of the formula I and the comonomer(s) M2, comprise one or more polyethylenically unsaturated monomers having, for example, 2, 3 or 4 nonconjugated ethylenically unsaturated double bonds, which are also referred to hereinafter as monomers M3. Examples of monomers M3 are diesters and triesters of ethylenically unsaturated carboxylic acids, especially the bis- and trisacrylates of diols or polyols having 3 or more OH groups, for example the bisacrylates and the bismethacrylates of ethylene glycol, diethylene glycol, triethylene glycol, neopentyl glycol or polyethylene glycols. Such monomers M3 are, if desired, used, for example, in an amount of 0.01% to 10% by weight, based on the total amount of monomers to be polymerized.

The polymers of the invention preferably have a number-average molecular weight in the range from 1000 to $10^6$ g/mol, especially in the range from 1200 to $10^5$ g/mol. The weight-average molecular weight of the polymers of the invention is preferably in the range from 1200 to $5\times10^6$ g/mol, especially in the range from 2000 to $2\times10^6$ g/mol. The molecular weights can be measured by gel permeation chromatography with tetrahydrofuran as eluent and polystyrene (PS) as standard.

The polymers of the invention have a glass transition temperature of preferably −50 to +20° C., especially of −30 to +10° C. The glass transition temperature is determined by differential scanning calorimetry (ASTM D 3418-08, what is called the "midpoint temperature"). The glass transition temperature of the polymer is the glass transition temperature obtained in the evaluation of the second heating curve (heating rate 20° C./min).

The polymerization of the monomers can be conducted by customary methods of free-radical polymerization. These include solution and precipitation polymerization, suspension polymerization and emulsion polymerization, including miniemulsion polymerization.

In a preferred embodiment of the invention, the polymerization process is effected in a nonaqueous solvent or diluent as polymerization medium. In other words, the polymerization is conducted in a solvent or diluent which does not comprise any water or comprises only small amounts of water, in the manner of a solution or precipitation polymerization. Based on the total volume of the polymerization mixture, the amount of water is preferably not more than 2% by weight, particularly not more than 1% by weight and especially not more than 0.5% by weight. Preferably, the amount of water, based on the monomer, is not more than 10% by weight, frequently not more than 5% by weight, particularly not more than 2% by weight and especially not more than 1% by weight.

Suitable solvents or diluents are especially those in which the monomers to be polymerized are soluble. Polymerization can also be effected in organic solvents in which the monomers to be polymerized are insoluble. In that case, the polymerization is effected as an oil-in-oil emulsion or suspension polymerization, where the monomers, depending on the ratios of amounts of monomers and organic solvent, form the coherent phase or preferably the disperse phase.

Suitable solvents comprise especially aprotic solvents. These include aliphatic and cycloaliphatic hydrocarbons and halohydrocarbons such as n-hexane, n-heptane, cyclohexane, dichloromethane, 1,2-dichloroethane, aromatic hydrocarbons and aromatic halohydrocarbons such as benzene, toluene, xylenes, chlorobenzene, dichlorobenzenes, anhydrides of aliphatic, nonpolymerizable carboxylic acids such as acetic anhydride, $C_1$-$C_6$-alkyl esters and $C_5$-$C_6$-cycloalkyl esters of aliphatic monocarboxylic acids having 1 to 4 carbon atoms, such as methyl acetate, ethyl acetate, propyl acetate, n-butyl acetate, methyl butyrate, ethyl butyrate, propyl butyrate, methyl propionate, ethyl propionate, propyl propionate, ethyl formate, butyl formate, cyclohexyl acetate and the like, $C_1$-$C_4$-alkoxy-$C_2$-$C_4$-alkyl alkanoates such as 1-methoxy-2-propyl acetate or 2-methoxyethyl acetate. N,N-di-$C_1$-$C_4$-alkylamides of aliphatic $C_1$-$C_4$-carboxylic acids, such as N,N-dimethylformamide, N,N-dimethylacetamide, N—$C_1$-$C_4$-alkyllactams such as N-methylpyrrolidone, N-ethylpyrrolidone, di-$C_1$-$C_4$-alkyl sulfoxides such as dimethyl sulfoxide, alicyclic and cyclic ketones having 3 to 8 carbon atoms, such as methyl ethyl ketone, acetone and cyclohexanone, di-$C_1$-$C_4$-alkyl ethers and aliphatic, cycloaliphatic and aromatic ethers such as diethyl ether, methyl tert-butyl ether, dioxane, tetrahydrofuran, monoglyme and anisole, and also cyclic and acyclic, saturated carbonates having preferably 3 to 8 carbon atoms, such as ethylene carbonate (1,3-dioxolan-2-one) and propylene carbonate, $C_1$-$C_4$-dialkyl carbonates such as dimethyl carbonate, diethyl carbonate, dipropyl carbonate, dibutyl carbonate, and mixtures of the aforementioned aprotic solvents. Suitable solvents for the polymerization are also protic solvents and mixtures thereof with one or more aprotic solvents. These include particularly aliphatic alcohols such as $C_2$-$C_4$-alkylene glycol mono-$C_1$-$C_4$-alkyl ethers such as 1-methoxy-2-propanol, $C_1$-$C_4$-alkyl-$C_2$-$C_4$-alkylene glycol mono-$C_1$-$C_4$-alkyl ethers such as 1-methoxy-2-methyl-2-propanol, $C_1$-$C_{10}$-alkanols such as methanol, ethanol, n-propanol, isopropanol, n-butanol, 2-butanol, isobutanol, tert-butanol, amyl alcohol, isoamyl alcohol, and mixtures of the aforementioned protic solvents.

Preferred solvents are $C_1$-$C_6$-alkyl esters of aliphatic $C_1$-$C_4$ monocarboxylic acids, such as n-butyl acetate, $C_2$-$C_4$-alkylene glycol mono-$C_1$-$C_4$-alkyl ethers such as 1-methoxy-2-propanol, $C_1$-$C_4$-alkyl-$C_2$-$C_4$-alkylene glycol mono-$C_1$-$C_4$-alkyl ethers such as 1-methoxy-2-methyl-2-propanol, $C_1$-$C_4$-dialkyl carbonates such as dimethyl carbonate, diethyl carbonate, dipropyl carbonate, dibutyl carbonate, cyclic carbonates such as ethylene carbonate and propylene carbonate, ethers such as glyme and anisole.

In the case of precipitation polymerization, the solvent or diluent is an organic solvent or diluent in which the copolymer is insoluble. In the case of solution polymerization, the solvent is typically an organic solvent in which the copolymer is soluble.

Preferably, the organic solvent will be such that the amount of monomers M to be polymerized, based on the total amount of monomers M plus solvent, is in the range from 10% to 65% by weight, especially in the range from 20% to 60% by weight. In the case of a solution polymerization, accordingly, polymer solutions with solids contents in the range from 10% to 90% by weight and especially 20% to 80% by weight are obtained.

The monomers M can be polymerized by customary methods of free-radical homo- or copolymerization. Preferably, for this purpose, the monomers M will be polymerized under reaction conditions under which free radicals form. The free radicals are preferably formed by using what is called a polymerization initiator, i.e. a compound which forms free radicals on decomposition, which can be triggered chemically, thermally or photochemically.

The suitable polymerization initiators include organic azo compounds, organic peroxides and hydroperoxides, inorganic peroxides and what are called redox initiators. The organic peroxide compounds include, for example, tert-butyl peroxy-2-ethylhexanoate, tert-butyl peroxypivalate, acetyl peroxide, benzoyl peroxide, lauroyl peroxide, tert-butyl peroxyisobutyrate, caproyl peroxide. The hydroperoxides include, as well as hydrogen peroxide, also organic hydroperoxides such as cumene hydroperoxide, tert-butyl hydroperoxide, tert-amyl hydroperoxide and the like. The azo compounds include, for example, 2,2'-azobisisobutyronitrile, 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethyleneisobutyramidine), 2,2'-azobis(2-methylpropionamidine), N-(3-hydroxy-1,1-bis(hydroxymethyl)-propyl)-2-[1-(3-hydroxy-1,1-bis-(hydroxymethyl)propylcarbamoyl)-1-methylethylazo]-2-methyl-propionamide and N-(1-ethyl-3-hydroxypropyl)-2-[1-(1-ethyl-3-hydroxypropylcarbamoyl)-1-methylethylazo]-2-methylpropionamide. The inorganic peroxides include peroxodisulfuric acid and salts thereof, such as ammonium peroxodisulfate, sodium peroxodisulfate and potassium peroxodisulfate. Redox initiator systems are understood to mean initiator systems which comprise an oxidizing agent, for example a salt of peroxodisulfuric acid, hydrogen peroxide, or an organic peroxide such as tert-butyl hydroperoxide, and a reducing agent. As reducing agents, they preferably comprise a sulfur compound, which is especially selected from sodium hydrogensulfite, sodium hydroxymethanesulfinate and the hydrogensulfite adduct onto acetone. Further suitable reducing agents are phosphorus compounds such as phosphorous acid, hypophosphites and phosphinates, and hydrazine or hydrazine hydrate and ascorbic acid. In addition, redox initiator systems may comprise an addition of small amounts of redox metal salts, such as iron salts, vanadium salts, copper salts, chromium salts or manganese salts, for example the ascorbic acid/iron (II) sulfate/sodium peroxodisulfate redox initiator system. Particularly preferred initiators for the polymerization process according to the invention are azo compounds, especially azobisisobutyronitrile (AIBN).

For free-radical polymerization of the monomers M, these polymerization initiators are preferably used in an amount of 0.01 to 5% by weight, especially in an amount of 0.1 to 3% by weight, based on the monomers to be polymerized.

For polymerization, the customary polymerization techniques can be employed. Particular mention should be made here of a (semi)batchwise process in which the majority, i.e. at least 60% by weight, especially at least 80% by weight and frequently the total amount of the monomers M to be polymerized is initially charged in the polymerization vessel, and the monomer feed process, in which the majority of the monomers M to be polymerized, frequently at least 60% by weight, particularly at least 80% by weight and especially at least 90% by weight, is added to the polymerization vessel in the course of the polymerization reaction. For reasons of practicability, in the case of relatively large batches, the polymerization is frequently performed as a monomer feed process.

The polymerization initiator can be initially charged in the polymerization vessel or added in the course of the polymerization reaction. The procedure will frequently be to add at least a portion of the initiator, preferably at least 50% by weight and especially at least 80% by weight of the polymerization initiator, over the course of the polymerization reaction. More particularly, it has been found to be useful to initially charge a small portion of the monomers M, for example 0.1% to 20% by weight, based on the total amount of monomers M to be polymerized, optionally together with a portion or the entirety of polymerization initiator and a portion or the entirety of the solvent or diluent, in the polymerization vessel, to start the polymerization, for example by heating the polymerization mixture, and then to add the remainder of the monomers M and, if required, the remainder of polymerization initiator and solvent over the course of the polymerization.

The polymerization temperatures typically employed for the polymerization are, depending on the initiator system selected, preferably in the range from 20 to 180° C., particularly in the range from 40 to 130° C. and especially in the range from 50 to 120° C. The polymerization pressure is of minor importance and may be in the region of standard pressure or slightly reduced pressure, for example >800 mbar, or elevated pressure, for example up to 10 bar, though higher or lower pressures can likewise be employed. The polymerization time will preferably not exceed 10 hours and is frequently in the range from 1 to 8 hours.

The polymerization process of the invention can be performed in the reactors customary for a free-radical polymerization, for example stirred tanks, especially those with close-clearance stirrers, including stirred tank cascades, and tubular reactors, which may optionally have dynamic and/or static mixing elements. The reactors preferably have one or more devices for supply of the reactants and devices for withdrawal of the products, and optionally means for supplying and for removing the heat of reaction, and optionally means for controlling and/or monitoring the reaction parameters of pressure, temperature, conversion etc. The reactors can be operated batchwise or continuously.

After the polymerization has ended, the polymerization mixture can be worked up in a customary manner. In the case of a precipitation polymerization, the polymer can, for example, be filtered off. Volatile components, for example solvents, can also be removed by distillative measures. In the case of a solution polymerization, it is also possible to bring about a precipitation of the polymer obtained, for example by adding an organic solvent in which the polymer is insoluble. Optionally, the polymerization may also be followed by a solvent exchange, for example in order to convert the polymer from a solution to a dispersion. Optionally, the polymer obtained will be subjected to devolatilization, in order to remove further volatile constituents.

The present invention also provides a two-pack adhesive (especially two-pack laminating adhesive, for example for composite film lamination) comprising a first component comprising at least one copolymer of the invention and a second component comprising at least one polyfunctional hardener having at least two functional groups selected from primary amino groups, secondary amino groups, hydroxyl groups, phosphine groups, phosphonate groups and mercaptan groups. Preferably, the functional groups of the hardener are selected from aliphatic hydroxyl groups, aliphatic primary amino groups, aliphatic secondary amino groups, aliphatic phosphine groups, aliphatic phosphonate groups and aliphatic mercaptan groups.

Two-pack adhesives (also called two-pack binder compositions hereinafter) are understood to mean a binder comprising at least two polyfunctional binder constituents which react with one another to form bonds and in doing so form a polymeric network. Due to the alkylidene-1,3-dioxolan-2-one groups present therein, the polymers of the invention can react with numerous nucleophilic groups to form bonds. Examples of such nucleophilic groups are particularly aliphatic hydroxyl groups, aliphatic primary and secondary amino groups, phosphine groups, especially aliphatic phosphine groups, phosphonate groups, especially aliphatic phosphonate groups, and analogous phosphorus compounds, and also mercaptan groups, especially aliphatic mercaptan groups.

Accordingly, two-pack binder compositions comprise, as well as at least one polymer of the invention, preferably additionally at least one compound having at least 2 functional groups F, for example 2, 3, 4, 5, 6, 7, 8, 9 or 10 functional groups F, which are selected from aliphatic hydroxyl groups, aliphatic primary or secondary amino groups, aliphatic phosphine groups, aliphatic phosphonate groups and similar groups, and aliphatic mercaptan groups. These compounds are also referred to hereinafter as hardeners. Preferred functional groups F are aliphatic hydroxyl groups and aliphatic primary and secondary amino groups. Preferably, the amount of hardener is selected such that the molar ratio of functional alkylidene-1,3-dioxolan-2-one groups of the formula I to the functional groups F in the hardener is in the range from 1:10 to 10:1, particularly in the range from 5:1 to 1:5 and especially in the range from 1:2 to 2:1.

The hardener may be a low molecular weight substance, which means that the molecular weight thereof is below 500 g/mol, or an oligomeric or polymeric substance having a number-average molecular weight above 500 g/mol.

The hardeners preferred in accordance with the invention include aminic hardeners, i.e. hardeners which have at least two primary or secondary amino groups, and alcoholic hardeners, i.e. compounds which have at least two hydroxyl groups.

The aminic hardeners, also amine hardeners hereinafter, include, for example, aliphatic and cycloaliphatic polyamines, aromatic and araliphatic polyamines and polymeric amines, for example amino resins and polyamidoamines. Amine hardeners crosslink polymers having 1,3-dioxolan-2-one groups, also called carbonate polymers hereinafter, by reaction of the primary or secondary amino functions of the polyamines with the 1,3-dioxolan-2-one groups of the carbonate polymers to form urethane functions. Preferred polyamine hardeners have an average of at least two primary or secondary amino groups per molecule, for example two, three or four primary or secondary amino groups per molecule. They may also additionally comprise one or more tertiary amino groups. Suitable polyamines are, for example, aliphatic polyamines such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, 2,2-dimethylpropylenediamine, trimethylhexamethylenediamine, 1-(3-aminopropyl)-3-aminopropane, 1,3-bis(3-aminopropyl)propane, 4-ethyl-4-methylamino-1-octylamine, and the like;

cycloaliphatic diamines, such as 1,2-diaminocyclohexane, 1,2-, 1,3-, 1,4-bis(amino-methyl)cyclohexane, 1-methyl-2,4-diaminocyclohexane, N-cyclohexylpropylene-1,3-diamine, 4-(2-aminopropan-2-yl)-1-methylcyclohexane-1-amine, isophoronediamine, 4,4'-diaminodicyclohexylmethane (Dicykan), 3,3'-dimethyl-4,4'-diaminodicyclohexylmethane, 3,3',5,5'-tetramethyl-4,4'-diaminodicyclohexylmethane, 4,8-diaminotricyclo[5.2.1.0]decane, norbomanediamine, menthanediamine, menthenediamine, and the like;

aromatic diamines, such as tolylenediamine, xylylenediamine, especially meta-xylylenediamine (MXDA), bis(4-aminophenyl)methane (MDA or methylenedianiline), bis(4-aminophenyl) sulfone (also known as DADS, DDS or dapsone), and the like;

cyclic polyamines, such as piperazine, N-aminoethylpiperazine, and the like;

polyetheramines, especially difunctional and trifunctional primary polyetheramines based on polypropylene glycol, polyethylene glycol, polybutylene oxide, poly(1,4-butanediol), polytetrahydrofuran (polyTHF) or polypentylene oxide, for example 4,7,10-trioxatridecane-1,3-diamine, 4,7,10-trioxatridecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (from BASF SE), 1,3-diamino-4,7,10-trioxatridecane (from BASF SE), primary polyetheramines based on polypropylene glycol having a mean molar mass of 230, for example polyetheramine D 230 (from BASF SE) or Jeffamine® D 230 (from Huntsman), difunctional, primary polyetheramines based on polypropylene glycol having a mean molar mass of 400, e.g. polyetheramine D 400 (from BASF SE) or Jeffamine® XTJ 582 (from Huntsman), difunctional, primary polyetheramines based on polypropylene glycol having a mean molar mass of 2000, for example polyetheramine D 2000 (from BASF SE). Jeffamine® D2000 or Jeffamine® XTJ 578 (each from Huntsman), difunctional, primary polyetheramines based on propylene oxide having a mean molar mass of 4000, for example polyetheramine D 4000 (from BASF SE), trifunctional, primary polyetheramines prepared by reacting propylene oxide with trimethylolpropane followed by an amination of the terminal OH groups, having a mean molar mass of 403, for example polyetheramine T 403 (from BASF SE) or Jeffamine® T 403 (from Huntsman), trifunctional, primary polyetheramine prepared by reacting propylene oxide with glycerol, followed by an amination of the terminal OH groups, having a mean molar mass of 5000, for example polyetheramine T 5000 (from BASF SE) or Jeffamine® T 5000 (from Huntsman), aliphatic polyetheramines formed from a propylene oxide-grafted polyethylene glycol and having a mean molar mass of 600, for example Jeffamine® ED-600 or Jeffamine® XTJ 501 (each from Huntsman), aliphatic polyetheramines formed from a propylene oxide-grafted polyethylene glycol and having a mean molar mass of 900, for example Jeffamine® ED-900 (from Huntsman), aliphatic polyetheramines formed from a propylene oxide-grafted polyethylene glycol and having a mean molar mass of 2000, for example Jeffamine® ED-2003 (from Huntsman), difunctional, primary polyetheramine prepared by amination of a propylene oxide-grafted diethylene glycol, having a mean molar mass of 220, for example Jeffamine® HK-511 (from Huntsman), aliphatic polyetheramines based on a copolymer of poly(tetramethylene ether glycol) and polypropylene glycol having a mean molar mass of 1000, for example Jeffamine® XTJ-542 (from Huntsman), aliphatic polyetheramines based on a copolymer of poly(tetramethylene ether glycol) and polypropylene glycol having a mean molar mass of 1900, for example Jeffamine® XTJ-548 (from Huntsman), aliphatic polyetheramines based on a copolymer of poly(tetramethylene ether glycol) and polypropylene glycol having a mean molar mass of 1400, for example Jeffamine® XTJ-559 (from Huntsman), polyethertriamines based on a butylene oxide-grafted, at least trihydric alcohol having a mean molar mass of 400, for example Jeffamine® XTJ-566 (from Huntsman), aliphatic polyetheramines prepared by amination of butylene oxide-grafted alcohols having a mean molar mass of 219, for example Jeffamine® XTJ-568 (from Huntsman), polyetheramines based on pentaerythritol and propylene oxide having a mean molar mass of 600, for example Jeffamine® XTJ-616 (from Huntsman), polyetheramines based on triethylene glycol having a mean molar mass of 148, for example Jeffamine® EDR-148 (from Huntsman), difunctional, primary polyetheramines prepared by amination of a propylene oxide-grafted ethylene glycol, having a mean molar mass of 176, for example Jeffamine® EDR-176 (from Huntsman), and also polyetheramines prepared by amination of polytetrahydrofuran (polyTHF) having a mean molar mass of 250, for example PolyTHF-amine 350 (BASF SE), and mixtures of these amines;

polyamidoamines (amidopolyamines), which are obtainable by reaction of dimeric fatty acids (for example dimeric linoleic acid) with polyamines of low molecular weight, such as diethylenetriamine, 1-(3-aminopropyl)-3-aminopropane or triethylenetetramine, or other diamines, such as the aforementioned aliphatic or cycloaliphatic diamines;

adducts obtainable by reaction of amines, especially diamines, with a deficiency of epoxy resin or reactive diluent, preference being given to using those adducts in which about 5% to 20% of the epoxy groups have been reacted with amines, especially diamines;

phenalkamines as known from epoxide chemistry;

Mannich bases which are prepared, for example, by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, with aldehydes, preferably formaldehyde, and mono- or polyhydric phenols having at least one aldehyde-reactive core site, for example the various cresols and xylenols, p-tert-butylphenol, resorcinol, 4,4'-dihydroxydiphenylmethane, 4,4'-dihydroxydiphenyl-2,2-propane, but preferably phenol;

and mixtures of the aforementioned amine hardeners, especially mixtures of difunctional amines from the group of the aliphatic, cycloaliphatic and aromatic amines with the aforementioned polyetheramines.

Preferred aminic hardeners are aliphatic polyamines, especially 2,2-dimethylpropylenediamine, aromatic diamines, especially m-xylylenediamine (MXDA) and cycloaliphatic diamines, especially isophoronediamine, N-cyclohexylpropylene-1,3-diamine and 4,4'-diaminodicyclo-hexylmethane (Dicykan). Preference is also given to difunctional or trifunctional primary polyetheramines based on polypropylene glycol, for example Jeffamine® D 230 or Jeffamine® T 403. Particular preference is given to polyamines in which there is high mobility and low steric hindrance around the amino group, for example 4,9-dioxadodecane-1,12-diamine, 4,7,10-trioxatridecane-1,13-diamine, PolyTHF Amine 350 (BASF SE).

Preference is also given to mixtures of the amines specified as preferred, for example mixtures comprising 2,2-dimethylpropyleneamine and isophoronamine.

The alcoholic hardeners include particularly aliphatic and cycloaliphatic alcohols of low molecular weight and higher molecular weight. Alcoholic hardeners crosslink carbonate polymers by reaction of the primary or secondary alcohol functions with the 1,3-dioxolan-2-one groups of the carbonate polymers to form diesters of carbonic acid. Preferred alcoholic hardeners have an average of at least two primary or secondary hydroxyl groups per molecule, for example two, three or four primary or secondary hydroxyl groups per molecule. Suitable alcoholic hardeners of low molecular weight are, for example, butane-1,4-diol, ethylene glycol, diethylene glycol, triethylene glycol, neopentyl glycol, propane-1,3-diol, pentane-1,5-diol, hexane-1,6-diol, glycerol, diglycerol, pentaerythritol, dipentaerythritol, sugar alcohols such as sorbitol and mannitol.

Suitable alcoholic hardeners are also higher molecular weight polymeric polyols, for example polyester polyols, polycarbonate polyols, polyether polyols, polyacrylate polyols and polyvinyl alcohols. Suitable polymeric polyol hardeners preferably have a mean OH functionality of at least 1.5 mol and especially at least 1.8, for example in the range from 1.5 to 10 and especially in the range from 1.8 to 4. The mean OH functionality is understood to mean the mean number of OH groups per polymer chain. Typical polymeric polyol components preferably have a number-average molecular weight of about 250 to 50 000 g/mol, preferably of about 500 to 10 000 g/mol. Preferably, at least 50 mol % of the hydroxyl groups present in the polymeric polyol component are primary hydroxyl groups.

Preferably, polyester polyols are linear or branched polymeric compounds having ester groups in the polymer backbone and having free hydroxyl groups at the ends of the polymer chain. Preferably, these are polyesters which are obtained by polycondensation of dihydric alcohols with dibasic carboxylic acids, optionally in the presence of higher polyhydric alcohols (e.g. tri-, tetra-, penta- or hexahydric alcohols) and/or higher polybasic polycarboxylic acids. Rather than the free di- or polycarboxylic acids, it is also possible to use the corresponding di- or polycarboxylic anhydrides or corresponding di- or polycarboxylic esters of lower alcohols or mixtures thereof for preparation of the polyester polyols. The di- or polycarboxylic acids may be aliphatic, cycloaliphatic, araliphatic, aromatic or heterocyclic, preferably have 2 to 50 and especially 4 to 20 carbon atoms and may optionally be substituted, for example by halogen atoms, and/or be unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, alkenylsuccinic acid, fumaric acid and dimeric fatty acids. Useful diols for the preparation of the polyester polyols include especially aliphatic and cycloaliphatic diols having preferably 2 to 40 and especially 2 to 20 carbon atoms, for example ethylene glycol, propane-1,2-diol, propane-1,3-diol, butane-1,3-diol, butane-1,4-diol, butene-1,4-diol, butyne-1,4-diol, pentane-1,5-diol, neopentyl glycol, bis(hydroxymethyl)cydohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the general formula HO—$(CH_2)_x$—OH, where x is a number from 2 to 20, preferably an even number from 2 to 12. Examples thereof are ethylene glycol, butane-1,4-diol, hexane-1,6-diol, octane-1,8-diol and dodecane-1,12-diol. Additionally preferred are neopentyl glycol and pentane-1,5-diol.

Suitable alcoholic hardeners are also lactone-based polyester polyols, these being homo- or copolymers of lactones, preferably terminal hydroxyl-containing addition products of lactones onto suitable difunctional starter molecules.

Useful lactones are preferably those which derive from compounds of the general formula HO—(CH$_2$)$_z$—COOH where z is a number from 1 to 20 and one hydrogen atom of one methylene unit may also be substituted by a C$_1$-C$_4$-alkyl radical. Examples are ε-caprolactone, β-propiolactone, γ-butyrolactone and/or methyl-ε-caprolactone and mixtures thereof. Suitable starter molecules are, for example, the low molecular weight dihydric alcohols mentioned above as a formation component for the polyester polyols. The corresponding polymers of ε-caprolactone are particularly preferred. It is also possible to use lower polyester diols or polyether diols as starters for preparation of the lactone polymers. Rather than the polymers of lactones, it is also possible to use the corresponding chemically equivalent polycondensates of the hydroxycarboxylic acids corresponding to the lactones.

Examples of suitable polyester polyols are, for example, the polyester polyols known from Ullmanns Enzyklopädie der Technischen Chemie, 4th Edition, Volume 19, pages 62 to 65.

In addition, polycarbonate polyols are also useful, as obtainable, for example, by reaction of phosgene with an excess of the low molecular weight alcohols mentioned as formation components for the polyester polyols.

The polyether polyols are especially polyether polyols preparable by polymerization of ethylene oxide, propylene oxide, butylene oxide, tetrahydrofuran, styrene oxide or epichlorohydrin with themselves, for example in the presence of BF$_3$ or by addition of these compounds, optionally in a mixture or in succession, onto bi- or polyfunctional starter components having reactive hydrogen atoms, such as polyols or polyfunctional amines, for example water, ethylene glycol, propane-1,2-diol, propane-1,3-diol, 1,1-bis(4-hydroxyphenyl)propane, trimethylolpropane, glycerol, sorbitol, ethanolamine or ethylenediamine. Also useful are sucrose polyethers (see DE 1176358 and DE 1064938), and formitol- or formose-started polyethers (see DE 2639083 and DE 2737951).

Likewise suitable are polyhydroxy olefins, preferably those having 2 terminal hydroxyl groups, e.g. α,ω-dihydroxypolybutadiene.

Likewise suitable are polyhydroxypolyacrylates, where the hydroxyl groups may be arranged laterally or terminally. Examples thereof are α,ω-dihydroxypoly(meth)acrylic esters obtainable by homo- or copolymerization of alkyl esters of acrylic acid and/or of methacrylic acid in the presence of regulators comprising OH groups, such as mercaptoethanol or mercaptopropanol, and subsequent transesterification with a low molecular weight polyol, for example an alkylene glycol such as butanediol. Such polymers are known, for example, from EP-A 622 378. Examples thereof are additionally polymers obtainable by copolymerization of alkyl esters of acrylic acid and/or of methacrylic acid with hydroxyalkyl esters of ethylenically unsaturated carboxylic acid such as hydroxyethyl acrylate, hydroxypropyl acrylate, hydroxybutyl acrylate, hydroxyethyl methacrylate, hydroxypropyl methacrylate or hydroxybutyl methacrylate.

Also suitable are polyvinyl alcohols, which can preferably be obtained by full or partial hydrolysis of polyvinyl esters, especially polyvinyl acetate. If the polyvinyl esters, preferably polyvinyl acetate, are in partly hydrolyzed form, preferably not more than 50% to 95% of the ester groups are in hydrolyzed form as hydroxyl groups. If the polyvinyl esters, preferably polyvinyl acetate, are in fully hydrolyzed form, generally more than 95% up to 100% of the ester groups are in hydrolyzed form as hydroxyl groups.

Alcoholic hardeners preferred among the higher molecular weight polymeric polyols are especially polyacrylate polyols, these being obtainable, for example, under the Joncryl® brand name from BASF SE, e.g. Joncryl® 945.

Suitable hardeners are also amino acids, for example lysine, arginine, glutamine and asparagine, and the stereoisomers thereof and mixtures thereof.

It will be appreciated that it is also possible to use mixtures of different hardeners, for example mixtures of one or more aminic hardeners with one or more alcoholic hardeners, mixtures of one or more aminic hardeners with one or more amino acids, or mixtures of one or more alcoholic hardeners with one or more amino acids.

In the binder compositions of the invention, the total amount of hardeners is preferably 0.1% by weight to 50% by weight, frequently 0.5% to 40% by weight and especially 1% to 30% by weight, based on the total amount of carbonate polymers plus hardeners used.

The binder composition can be hardened thermally by heating the mixture of polymer of the invention and hardener to a temperature above the mixing temperature. The hardening can also be effected at lower temperatures. Typically, the binder compositions of the invention are hardened at temperatures in the range from 0 to 200° C., preferably in the range from 5 to 180° C. and especially in the range from 10 to 150° C. The temperature which is suitable depends on the respective hardeners and the desired hardening rate, and can be determined in the individual case by the person skilled in the art, for example by simple preliminary tests. In the lower temperature range (5 to approx. 35° C.), which of course corresponds to the usually prevailing ambient temperature, it is of course sufficient to mix polymer of the invention and hardener. Alternatively, the hardening is preferably microwave-induced.

The two-pack binder compositions may also comprise one or more suitable catalysts for the hardening, which are guided in a known manner by the nature of the reactive functional groups F. The catalysts are, if desired, used in proportions of 0.01% by weight to about 10% by weight, based on the total weight of the polymers of the invention having functional alkylidene-1,3-dioxolan-2-one groups of the formula I and of the hardener. In one configuration, no catalysts are required, particularly in the case of hardeners which have amino groups as functional groups, which means that the content of catalysts in the composition in that case is less than 0.01% by weight. Catalysts are used with preference when the hardener has reactive groups F other than amino groups, especially when the hardener has hydroxyl groups.

Catalysts used with preference are basic catalysts, more preferably organic amines and organic phosphines. Among the organic amines, preference is given to amidine bases, for example 1,8-diazabicyclo[5.4.0]undec-7-ene (DBU) and 1,5-diazabicyclo[4.3.0]non-5-ene (DBN), and to mono-C$_1$-C$_6$-alkyl-, di-C$_1$-C$_6$-alkyl- and tri-C$_1$-C$_6$-alkylamines, especially triethylamine and tert-butylamine. Among the organic phosphines, preference is given to trialkylphosphines and triarylphosphines, for example tri-n-butylphosphine and triphenylphosphine. The catalysts can of course also be used as mixtures, optionally in combination with tri-C$_1$-C$_6$-alkylammonium halides and copper salts, for example triphenylphosphine in combination with a tri-C$_1$-C$_6$-alkyl-ammonium halide and a copper salt, e.g. copper(I) chloride, copper(I) bromide, copper(II) chloride or copper(II) sulfate.

As well as the aforementioned constituents, the two-pack binder composition may comprise the additives customary therefor. The choice of suitable conventional additives for the composition of the invention depends on the particular end use of the two-pack binder composition and can be determined in the individual case by the person skilled in the art.

Suitable acids comprise, for example, antioxidants. UV absorbers/light stabilizers, metal deactivators, antistats, reinforcers, fillers, antifogging agents, blowing agents, biocides, plasticizers, lubricants, emulsifiers, colorants, pigments, rheology agents, impact tougheners, adhesion regulators, optical brighteners, flame retardants, antidripping agents, nucleating agents, wetting agents, thickeners, protective colloids, defoamers, tackifiers, solvents and reactive diluents, and mixtures thereof.

Fillers may be organic and inorganic in nature; preferred inorganic fillers take the form of platelets which can be aligned to form layers having enhanced barrier action against liquids and gases. Examples are sheet silicates such as montmorillonite and hectorite, as described, for example, in WO 2011/089089, WO 2012/175427 or in WO 2012/175431. Preference is given to sheet silicates having an aspect ratio of at least 50, at least 400, or at least 1000, and especially greater than or equal to 10 000. The layer thickness is, for example, about 1 nm. The sheet silicates may be of natural or synthetic origin. Suitable sheet silicates are, for example, montmorillonite, bentonite, kaolinite, mica, hectorite, fluorohectorite, saponite, beidellite, nontronite, stevensite, vermiculite, fluorovermiculite, halloysite, volkonskoite, suconite, magadite, sauconite, stibensite, stipulgite, attapulgite, illite, kenyaite, smectite, allevardite, muscovite, palygorskite, sepiolite, silinaite, grumantite, revdite, zeolite, fuller's earth, natural or synthetic talc or mica, or permutite. Particular preference is given to montmorillonite (aluminum magnesium silicate), hectorite (magnesium lithium silicate), synthetic fluorohectorite and exfoliated, organically modified smectites. The sheet silicates may be modified or unmodified. Preference is given to cationically modified sheet silicates. "Cationically modified" means that inorganic cations in the sheet silicate have been at least partly exchanged for organic cations, for example by an ion exchange method. Organic cations are organic compounds having at least one cationic group, for example quaternary ammonium group, phosphonium group, pyridinium group or the like, or a cationic amine salt.

Any light stabilizers/UV absorbers, antioxidants and metal deactivators used preferably have a high migration stability and thermal stability. They are selected, for example, from groups a) to t). The compounds of groups a) to g) and i) are light stabilizers/UV absorbers, while compounds j) to t) act as stabilizers.

a) 4,4-diarylbutadienes,
b) cinnamic esters,
c) benzotriazoles,
d) hydroxybenzophenones,
e) diphenyl cyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thio synergists,
r) peroxide-destroying compounds,
s) polyamide stabilizers and
t) basic costabilizers.

The two-pack adhesive is preferably free of isocyanates, meaning that it is preferably does not comprise any isocyanate compounds as hardeners. The two-pack adhesive is preferably either in the form of a solution in an organic solvent or is solvent-free. "Solvent-free" means that less than 5% by weight, more preferably less than 2% by weight or zero organic solvent or water is present.

The invention also provides a process for producing laminates, wherein a film/foil is laminated onto a substrate using at least one copolymer of the invention or using a two-pack adhesive of the invention. Laminations are a method for bonding large-area substrates, for example for the production of composite films and for the production of laminated shaped bodies. Suitable substrates are, for example, polymer films, metal foils, paper, and shaped bodies made from metal, plastic or wood.

The present invention thus also relates to a process for producing composite films, in which a two-pack adhesive of the invention is used. In this case, the two-pack adhesives can be used as such or after formulation with customary additives. In the process for producing composite films, at least two films are bonded to one another using the two-pack adhesive.

In the process of the invention for production of composite films, the two-pack adhesive of the invention is applied to the large-area substrates to be bonded, preferably with a layer thickness of 0.1 to 20 $g/m^2$, more preferably 1 to 7 $g/m^2$, for example by knife-coating, painting, etc. It is possible to employ standard coating processes, examples being roll coating, counter-rotating roll coating, gravure roll coating, counter-rotating gravure roll coating, brush coating, bar coating, spray coating, airbrush coating, meniscus coating, curtain coating, or dip coating. After a short time for evaporation of volatile constituents, the coated substrate may then be laminated with a second substrate, where the temperature for example may be 20 to 200° C., preferably 20 to 100° C. and the pressure for example may be 100 to 3000 $kN/m^2$, preferably 300 to 2000 $kN/m^2$.

At least one of the films/foils may have been printed or metalized on the side coated with the adhesive. Suitable substrates are, for example, polymer films, especially made from polyethylene (PE), oriented polypropylene (OPP), unoriented polypropylene (CPP), polyamide (PA), polyethylene terephthalate (PET), polyacetate, cellophane, polymer films coated with metal (by vapor deposition), for example with aluminum (for short: metalized films), or metal foils, for example made from aluminum. The films/foils mentioned may be bonded to one another or to paper or to a film/foil of another type, for example polymer films to metal foils, different polymer films to one another, etc. The films/foils mentioned may, for example, also have been printed with printing inks.

One embodiment of the invention is a composite film produced using one of the above-described two-pack adhesives of the invention, wherein the material of a first film is selected from OPP, CPP, PE, PET and PA and wherein the material of a second film/foil is selected from OPP, CPP, PE, PET, PA and metal foil. In one embodiment of the invention, the first film and/or the second film/foil has been printed or metalized on the particular side which is coated with the adhesive. The thickness of the substrate films may, for example, be from 5 to 100 μm, preferably from 5 to 40 μm.

A surface treatment of the film substrates is not absolutely necessary prior to the coating with an adhesive of the invention. Better results can, however, be obtained if the surface of the film substrates is modified prior to the coating. In this case, it is possible to employ standard surface treatments, for example corona treatment to enhance the bonding. The corona treatment or other surface treatments are conducted to the degree required for sufficient wettability with the coating composition. Typically, a corona treatment of about 10 watts per square meter and minute is sufficient for this purpose. Alternatively or additionally, it is optionally also possible to use primers or intermediate layers between the film substrate and adhesive coating. In addition, the composite films may have further, additional functional layers, for example barrier layers, printed layers, paint or lacquer layers or protective layers. The functional layers may be on the outside, i.e. on the opposite side of the film substrate from the adhesive-coated side, or on the inside, between the film substrate and adhesive layer.

The adhesive of the invention is capable of building up sufficiently high bond strengths within a short time. Preferably, a laminate produced in accordance with the invention has a shear strength of greater than 0.2 N after 1 minute and a shear strength of greater than 1 N after 24 hours, measured at 20° C. (see examples).

The invention also provides a laminate produced by the process of the invention.

The invention also provides for the use of copolymers of the invention as components of adhesives, especially of laminating adhesives, especially of two-pack adhesives or of two-pack laminating adhesives, and for the use as components of lacquers, coatings, sealants, paints and inks, and for binding of fibers and particles. The invention also provides for the use of copolymers of the invention for production of flexible packaging, especially of flexible food packaging.

Particular advantages of the production process of the invention and the products of the invention are especially:

isocyanate-free laminating adhesive, especially of good suitability for flexible packaging, especially for food packaging development of sufficiently high bond strengths in the packaging laminate within a short time.

EXAMPLES

1. Materials

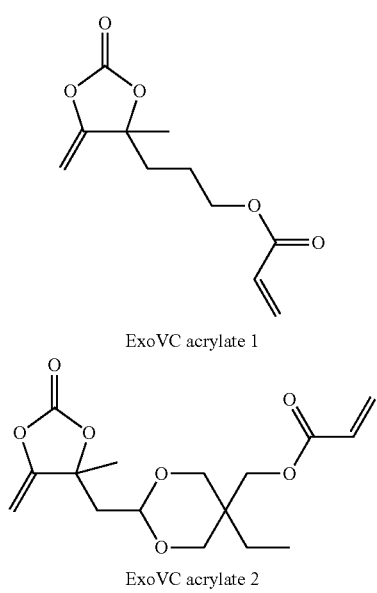

ExoVC acrylate 1

ExoVC acrylate 2

2. Preparation Examples of Monomers 2.1. Preparation of exoVC Acrylate 1

The preparation is effected in four stages.

The reaction scheme which follows comprises stages 1 to 3:

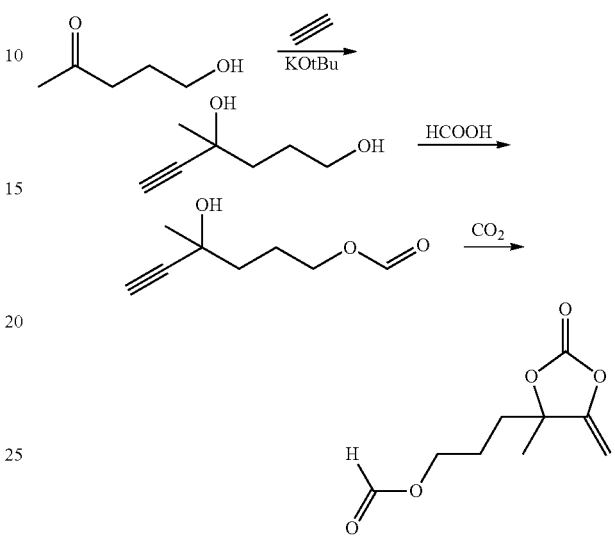

1st Stage: Reaction of Hydroxypentanone with Acetylene to Give the Acetylene Adduct:

KOtBu (800 g, 7.1 mol) is initially charged in anhydrous THF (4.5 L) and cooled to 0-3° C. Acetylene (280 g, 10.8 mol) is introduced at this temperature within 3 h. While continuing to introduce acetylene (130 g, 5 mol), hydroxypentanone (550 g, 5.39 mol) is then added dropwise at 0-6° C. within 1 h. After passing through a viscosity maximum, this gives rise to an orange-brown solution. After stirring at 0-3° C. for a further 1 h, the mixture is warmed to RT, and ammonium chloride (1068 g in 5 L of water) is added at 20-25° C. within 45 min. This forms two phases. The organic phase is removed and dried over sodium sulfate, and the solvent is removed on a rotary evaporator at 40° C. and 5 mbar. 649 g of a brown oil are obtained. This is distilled in an oil-pump vacuum, observing a maximum bottom temperature of 130° C. The main fraction was obtained at 110-111° C. in the form of a yellow oil (440 g, 3.4 mol, 64%).

Purity (GC area %): 93%

2nd Stage: Reaction of the Diol with Formic Acid to Give the Formate:

The diol (1.305 kg, 10.2 mol) obtained in the first stage is initially charged and admixed at 7-8° C. with formic acid (1.512 L, 40 mol) within 1 h. Then the mixture is warmed to room temperature and the progress of the reaction is monitored by means of GC/FID. The reaction is allowed to run until there is virtually no more increase in the main peak, which is the case after about 4 h at RT. If the reaction is continued beyond this point, there is increasing formation of diformylated product. For workup, the mixture is first concentrated under reduced pressure, without heating, and the resulting crude product is then distilled at 12 mbar. The main fraction distills over at 112-115° C. as a clear yellow liquid (1.453 kg, 9.3 mol, 91%).

Purity (GC area %): 93%

3rd Stage: Ring Closure with CO$_2$ to Give exoVC Formate

The formate obtained in the second stage (1.623 kg, 10.4 mol) is admixed with silver acetate (1.38 g) and TMTACN (N,N',N"-trimethyl-1,4,7-triazacydononane, 13.8 mL), and CO$_2$ is injected to 10 bar in a stirred autoclave with a pressure-retaining valve. Within 5 h, the temperature rises to 56° C. and the pressure to 18 bar. Once the temperature has dropped back to RT, the mixture is heated to 70° C. The pressure rises to about 28 bar. After about 4 h, monitoring of the reaction shows that there is virtually no more reactant (GC/FID). The mixture is cooled and decompressed. After adding dichloromethane (1.5 L), the contents of the autoclave are washed twice with HCl (10% solution, 480 mL each time) and dried over sodium sulfate, and the solvent is removed on a rotary evaporator (40° C., 60 mbar). Thereafter, while stirring at RT, all the constituents that are volatile under an oil-pump vacuum are removed, which can take up to 48 h. About 1.9 kg of crude product are obtained. For further purification, in a thin-film evaporator with a wiper system, volatile components are removed first (0.05-0.02 mbar, jacket temperature 109-114° C.). For this purpose, at least two runs are generally required. In a further run, the target compound is then separated from nonvolatile constituents (0.012 mbar, jacket temperature 170° C.).

Yield of exoVC formate: 1.419 kg (7.1 mol, 68%).

Purity (GC area %): 97%

4th Stage: Acrylation to Give exoVC Acrylate 1

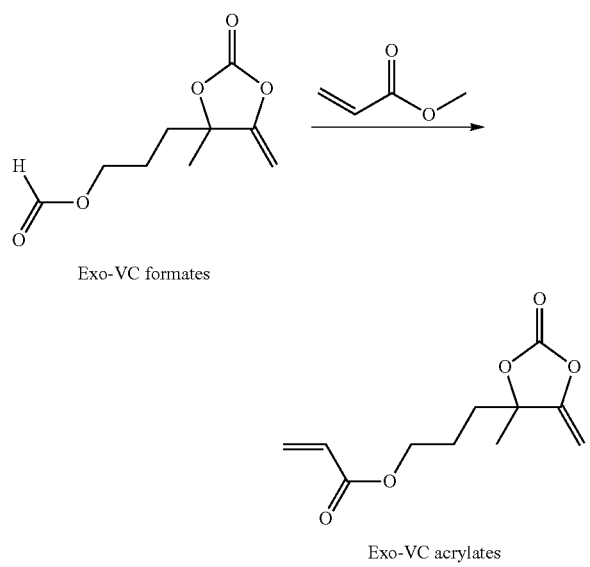

Exo-VC formates

Exo-VC acrylates

A two liter flat-bottom flask with Teflon stirrer, thermometer and condenser was charged with 300 g of exo-VC formate (1.5 mol) and 1200 g of methyl acrylate (14 mol). The methyl acrylate comprised 0.3 g of MeHQ (monomethyl ether of hydroquinone) as inhibitor. The mixture was stirred and heated to 40° C. 30 g of the enzyme *Candida Antarctica* Lipase B (immobilized form) were added. After 24 hours, the resultant mixture was decanted into a two liter round-bottom flask, leaving the enzyme in the flat-bottom flask. The methanol formed and, simultaneously, methyl acrylate were removed under reduced pressure. The residue was introduced back into the flat-bottom flask, which comprises the enzyme, together with 1000 g of fresh methyl acrylate. The resultant mixture was stirred at 40° C. for another 24 hours. The reaction mixture was cooled down to room temperature and filtered. Methanol and unconverted methyl acrylate were distilled off under reduced pressure.

The yield was 339 g of exo-VC acrylate 1.

Purity: 96.7% (determined by gas chromatography)

2.2 Preparation of exoVC Acrylate 2

The preparation is effected in four stages.

The following reaction scheme comprises stages 1 to 3:

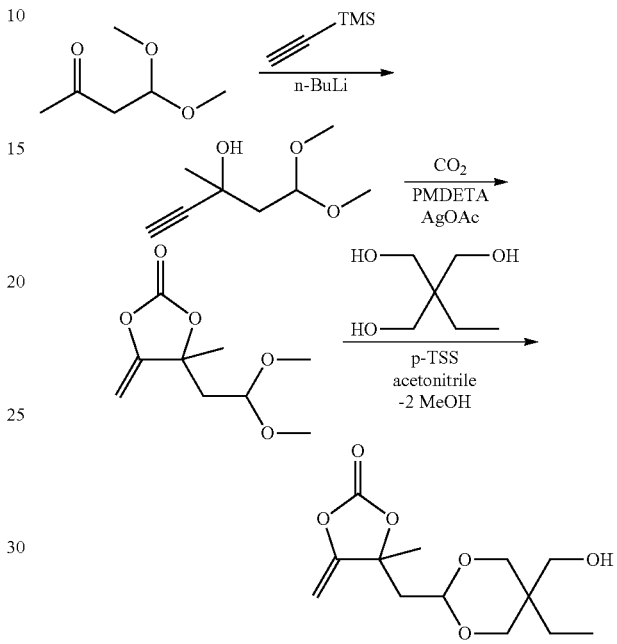

1.) Ethynylation of 4,4-dimethoxybutan-2-one:

TMS-acetylene (982 g, 10 mol) is initially charged under argon in THF (17 L, dried over molecular sieve) and cooled down to −68° C. While stirring, within 1 h, n-butyllithium (2.5 M in hexane, 4 L) is added dropwise at −68° C. and stirred for a further 1 h. Within 30 min, the ketone (1.319 kg, 10 mol) is then added dropwise at −68° C. to −54° C. and the mixture is subsequently stirred for a further 15 min. Thereafter, the mixture is warmed to 9° C. and water (2.9 L) is added in one portion. The temperature rises to about 17° C. The reaction mixture is concentrated thoroughly at 450° C./8 Torr. By GC analysis, it is ensured that no TMS-protected product is present any longer. The residue is suspended in diethyl ether (750 mL) and filtered, and the filtration residue is washed once again with diethyl ether. The filtrate is concentrated under reduced pressure. About 1.2 kg of raw material remain as a brown liquid. By vacuum distillation (5 mbar), about 1.1 kg (7 mol, 70%) of ethynylated product are obtained therefrom at 64-68° C. as a colorless oil.

Purity: >96% (GC area %)

2.) Ring Closure with CO$_2$:

The acetylene alcohol obtained in stage 1 (1233 g; 7.79 mol) is initially charged in acetonitrile (1.2 L) and, in a stirred autoclave. PMDETA (pentamethyldiethylenetriamine; 138.9 g; 0.8 mol) and AgOAc (12.9 g; 0.078 mol) are added. CO$_2$ is injected to 50 bar and the mixture is stirred for 2.5 h. The temperature rises up to 75° C. After cooling to room temperature, the reaction mixture is decompressed to standard pressure, filtered and concentrated at 100° C./5 mbar. About 1.5 kg of raw material remain as a brown liquid. By vacuum distillation at 5 mbar, about 1.39 kg of the carbonate are obtained therefrom at 114-115° C. as an orange oil which crystallizes through overnight (possibly after addition of a few seed crystals).

The mass of crystals is stirred with cyclohexane (1.34 L) and filtered with suction, and the residue is washed once again with cyclohexane (0.45 L). After drying under reduced pressure, 1.29 kg (6.38 mol, 64%) of almost colorless solids are obtained.

Purity: >99% (GC area %)

3.) Transacetalization with Trimethylolpropane:

The dimethoxy-substituted carbonate from stage 2 (250 g, 1.24 mol) is initially charged in 1.4 L of acetonitrile under an argon atmosphere. Then 253 g (1.87 mol) of trimethylolpropane and 407 mg (0.002 mol) of p-toluenesulfonic acid hydrate are added. The mixture is heated under reflux for 10 h. After cooling to room temperature, the solvent is removed under reduced pressure and the residue is taken up in about 1 L of MTBE. The mixture is washed four times with 300 ml each time of water. The organic phase is dried with sodium sulfate, filtered and concentrated on a rotary evaporator. This is followed by drying at 40° C. in an oil-pump vacuum for several hours. The product is obtained as a viscous, pale yellowish oil (339 g) in the form of two isomers, which crystallizes gradually when left to stand at room temperature for a prolonged period.

Purity: >98% (GC area %)

4.) Acrylation to Give exoVC Acrylate 2

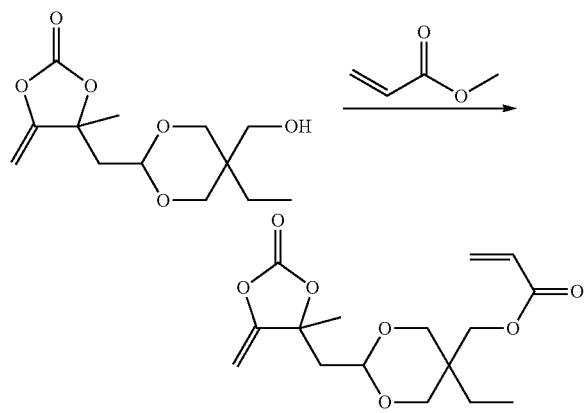

A two liter flat-bottom flask with Teflon stirrer, thermometer and condenser was charged with 129 g of exo-VC-PMP alcohol (0.47 mol), 409 g of methyl acrylate (4.75 mol) and 152 g of 5 Å molecular sieve powder. The methyl acrylate comprised 0.3 g of MeHQ (monomethyl ether of hydroquinone) as inhibitor. The mixture was stirred and heated to 60° C. 9.7 g of the enzyme *Candida Antarctica* Lipase B (immobilized form) were added. After 72 hours, 100 g of 5 Å molecular sieve powder and 9.7 g of the enzyme *Candida Antarctica* Lipase B (immobilized form) were added. After 96 hours, the reaction mixture was cooled to room temperature and filtered. Methanol and unconverted methyl acrylate were distilled off under reduced pressure.

The yield was 153 g of exoVC acrylate 2.

Purity: 97.1% (determined by gas chromatography)

3. Preparation Examples of Copolymers 3.1 Copolymer of exoVC Acrylate 1 and n-butyl Acrylate A polymerization apparatus consisting of glass reactor, reflux condenser, stirrer and nitrogen inlet is initially charged with 864.9 g of methyl ethyl ketone (MEK) under a gentle nitrogen stream and heated to 80° C. 15 g of a monomer mixture consisting of 225 g of n-butyl acrylate and 75 g of exoVC acrylate 1 are added. After 80° C. has been reached again, 1.7 g of an initiator solution composed of 4 g of tert-butyl perpivalate (75% in mineral oil) and 30 g of MEK are added and initial polymerization is effected for 3 min. Then the remaining 285 g of monomer mixture and 32.3 g of initiator solution are run in within 3 h. Subsequently, the temperature is increased to 90° C. and a solution of 0.96 g of tert-butyl perpivalate (75% in mineral oil) in 15 g of MEK is added within 30 min. Thereafter, the mixture is cooled.

K value; 1% in THF: 27
Solids content: 22.9%

3.2 Analogously to Example 1, it is Possible to Prepare a Copolymer with exoVC Acrylate 2.

4. Two-pack Adhesive

The copolymer described in example 3.1 was blended with 2% by weight of isophoronediamine (IPDA) as hardener and the resulting reactive two-pack adhesive, immediately after mixing, was applied in a layer thickness of 3 μm, on the printed side, to a printed polyester film of thickness 12 μm. The solvent was evaporated by means of a hot air stream and then, in a calender, a polyethylene film of thickness 60 μm, which had been provided with a corona treatment beforehand, was laminated onto the adhesive layer under a pressure of 3 bar. The resulting laminate was cut into strips of width 15 mm and the peel strength of these strips was determined at room temperature (20° C.) a) after 1 min and b) after 24 h [N/15 mm]. This was done using a strength tester, and the peel strength test was conducted at a tearing angle of 90° (T test). The results are shown in table 1.

In an analogous manner, it is possible to produce and use a two-component adhesive with the copolymer of example 3.2.

TABLE 1

Results of the peel strength measurements

| | Peel strength after 1 min [N/15 mm] | Peel strength after 24 h [N/15 mm] |
| --- | --- | --- |
| Example 3.1 blended with 2% by weight of IPDA | 0.3 | 1.4 |
| Example 3.1 without IPDA (comparison, one-pack adhesive) | <0.1 | <0.1 |

A peel strength of greater than 0.2 N after 1 min and greater than 1 N after 24 h is sufficient for applications of the adhesive in flexible packaging, and builds up within a sufficiently short time to be utilizable industrially.

The invention claimed is:

1. A copolymer, formed by free-radical copolymerization from
(a) at least one monomer M1 of formula (I)

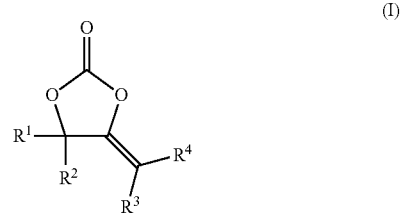

in which
$R^1$ is an organic radical comprising a (meth)acryloyl group, and
$R^2$, $R^3$ and $R^4$ are each independently a hydrogen atom or a C1- to C10-alkyl group; and
(b) at least one ethylenically unsaturated, free-radically copolymerizable monomer M2 other than the at least one monomer M1.

2. The copolymer according to claim 1, wherein the at least one monomer M1 is used in an amount of 5% to 50% by weight, based on a total amount of all monomers, and the at least one monomer M2 is used in an amount of 50% to 95% by weight, based on the total amount of all the monomers.

3. The copolymer according to claim 1, wherein $R^1$ is an organic radical comprising a total of not more than 24 carbon atoms and, apart from oxygen atoms, does not comprise any further heteroatoms.

4. The copolymer according to claim 1, wherein $R^1$ is a group of formula (II)

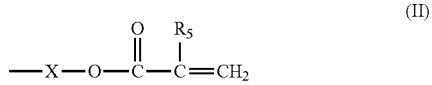

(II)

in which X is a bond or an alkylene group comprising 1 to 18 carbon atoms and $R^5$ is a hydrogen atom or a methyl group,
or a group of formula (III)

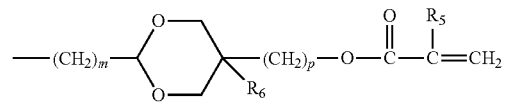

(III)

in which m and p are each independently 0 or a number from 1 to 10, $R^5$ is a hydrogen atom or a methyl group and $R^6$ is a hydrogen atom or a C1- to C10-alkyl group,
or a group of formula (IV)

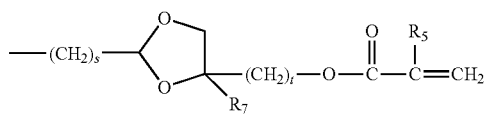

(IV)

in which s and t are each independently 0 or an integer from 1 to 10, $R^5$ is a hydrogen atom or a methyl group and $R^7$ is a hydrogen atom or a C1- to C10-alkyl group.

5. The copolymer according to claim 1, wherein $R^2$ is a methyl group and $R^3$ and $R^4$ are each a hydrogen atom.

6. The copolymer according to claim 1, wherein the at least one monomer M2 is selected from the group consisting of a vinylaromatic hydrocarbon, an ester of a monoethylenically unsaturated $C_3$-$C_8$ monocarboxylic acid with a $C_1$-$C_{20}$-alkanol, a $C_5$-$C_8$-cycloalkanol, a phenyl-$C_1$-$C_4$-alkanol or a phenoxy-$C_1$-$C_4$-alkanol, a vinyl ester of an aliphatic carboxylic acid comprising 1 to 20 carbon atoms, and a conjugated diethylenically unsaturated $C_4$-$C_{10}$ olefin.

7. The copolymer according to claim 1, which has a glass transition temperature of −50 to +20° C.

8. A two-pack adhesive, comprising:
a first pack comprising at least one copolymer according to claim 1 and
a second pack comprising at least one polyfunctional hardener comprising at least two functional groups selected from the group consisting of a primary amino group, a secondary amino group, a hydroxyl group, a phosphine group, a phosphonate group, and a mercaptan group.

9. The two-pack adhesive according to claim 8, wherein a molar ratio of alkylidene-1,3-dioxolan-2-one groups in the copolymer to the functional groups in the hardener is from 1:10 to 10:1.

10. The two-pack adhesive according to claim 8, which is free of isocyanates and is either in a form of a solution in an organic solvent or in a solvent-free form.

11. The two-pack adhesive according to claim 8, wherein a laminate produced therewith has a shear strength of greater than 0.2 N after 1 minute and a shear strength of greater than 1 N after 24 hours, measured at 20° C.

12. The two-pack adhesive according to claim 8, further comprising
at least one catalyst for reacting alkylidene-1,3-dioxolan-2-one groups of the copolymer with the functional groups of the hardener.

13. A process for producing a laminate, the processing comprising:
laminating a film onto a substrate using at least one copolymer according to claim 1.

14. The process according to claim 13, wherein the substrate is at least one selected from the group consisting of a polymer film, a metal foil, paper, and a shaped body made from metal, plastic or wood.

15. A laminate, produced by the process according to claim 13.

16. An article, comprising
the copolymer according to claim 1,
wherein the article is an adhesive, a lacquer, a coating, a sealant, a paint, or an ink.

17. A method for producing flexible food packaging, the method comprising:
introducing the article into the flexible food packaging.

18. A method for binding fibers and/or particles, the method comprising:
binding the fibers and/or particles with the copolymer according to claim 1.

* * * * *